2 Sheets—Sheet 1.

J. HAPTONSTALL & S. BANKS.
Cooking Apparatus and Dinner-Pail.

No. 224,425. Patented Feb. 10, 1880.

Witnesses
Fred G. Dietrich
Joseph T. Power

Inventors
John Haptonstall
Samuel Banks.
by A. Peterson
Attorneys

N. PETERS, PHOTO-LITHOGRAPHER, WASHINGTON, D.C.

2 Sheets—Sheet 2.

J. HAPTONSTALL & S. BANKS.
Cooking Apparatus and Dinner-Pail.

No. 224,425. Patented Feb. 10, 1880.

Witnesses:
Fred. G. Dieterich
Joseph V. Powers

Inventors
John Haptonstall
Samuel Banks
by A. Peterson & Co. Attorneys

UNITED STATES PATENT OFFICE.

JOHN HAPTONSTALL AND SAMUEL BANKS, OF ADEL, IOWA, ASSIGNORS OF ONE-THIRD OF THEIR RIGHT TO ARCH G. BRENTON, OF SAME PLACE.

COOKING APPARATUS AND DINNER-PAIL.

SPECIFICATION forming part of Letters Patent No. 224,425, dated February 10, 1880.

Application filed November 12, 1879.

*To all whom it may concern:*

Be it known that we, JOHN HAPTONSTALL and SAMUEL BANKS, of Adel, in the county of Dallas and State of Iowa, have invented certain new and useful Improvements in a Combined Cooking Apparatus and Dinner-Pail; and we do hereby declare that the following is a full, clear, and exact description of the invention, which will enable others skilled in the art to which it appertains to make and use the same, reference being had to the accompanying drawings, which form a part of this specification, and in which—

Figure 1:
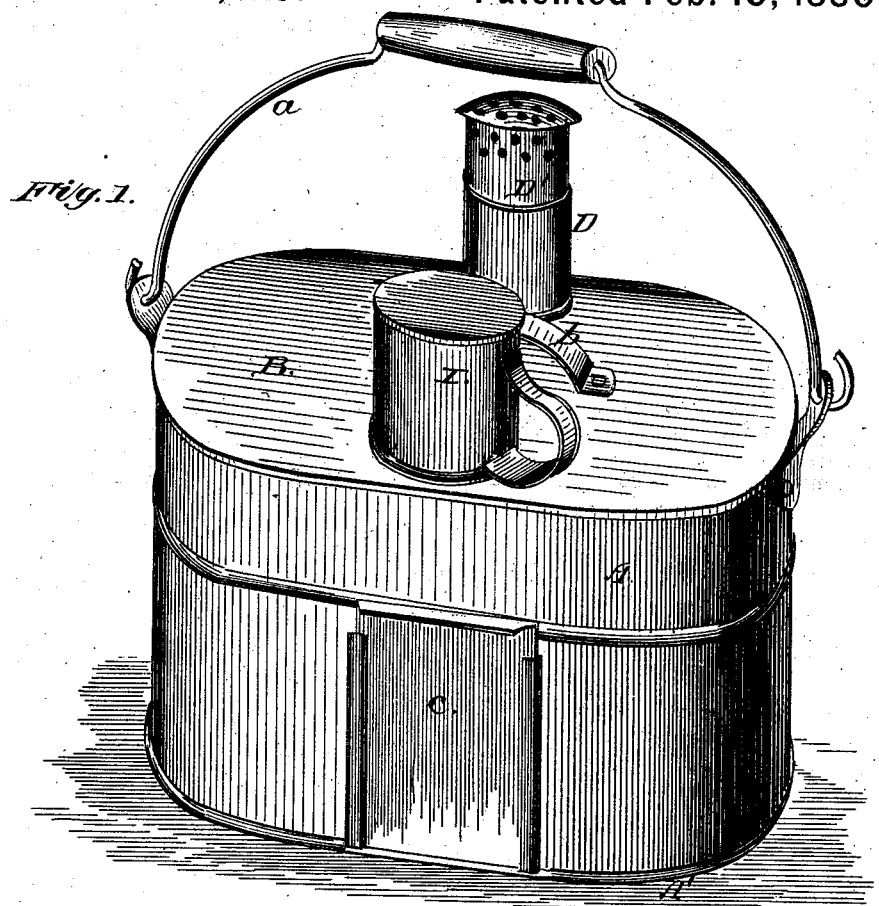
Figure 2:
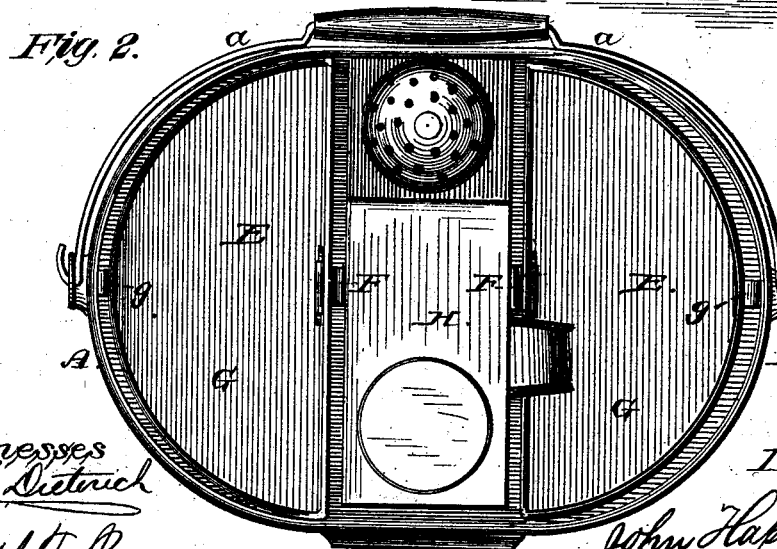
Figure 3:
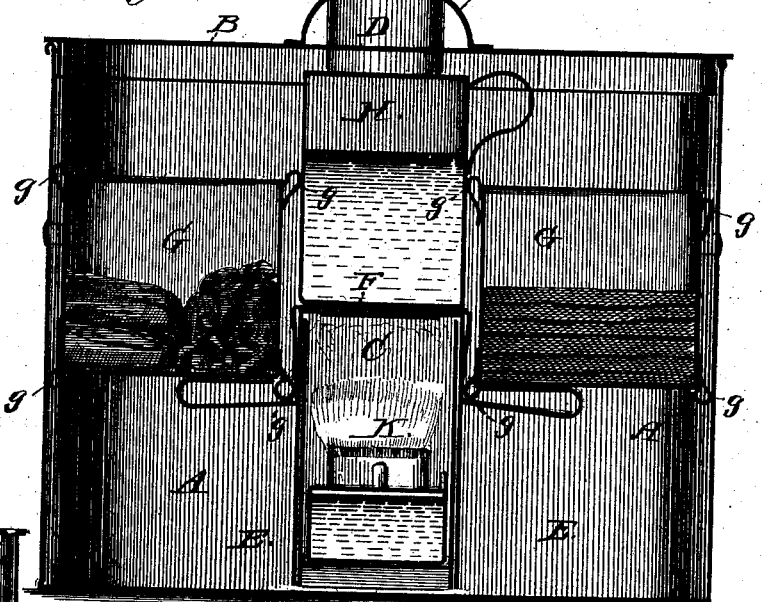
Figure 4:
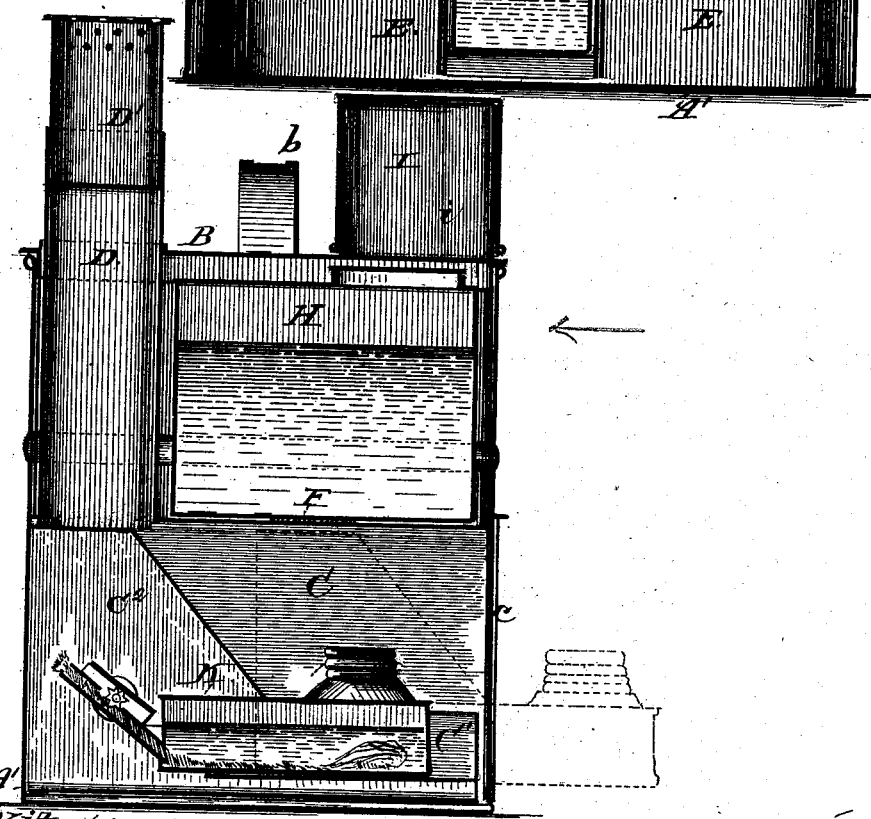

Figure 1 is a perspective view. Fig. 2 is a plan or top view, the cover having been removed. Fig. 3 is a longitudinal vertical section, and Fig. 4 is a transverse vertical section.

Similar letters of reference indicate corresponding parts in all the figures.

This invention relates to apparatus for cooking; and it consists in the detailed construction and arrangement of parts of a portable vessel adapted to be used as a dinner-pail, for cooking, baking, or warming articles of food, for boiling water, and for similar purposes, substantially as hereinafter more fully set forth.

In the drawings, A is a sheet-metal vessel, oval in shape, and of any suitable size, and provided with a bottom, A', bail-handle a, and cover B, having the handle b.

Inserted centrally and transversely through the vessel A, a short distance above its bottom, is a furnace, C, also made of sheet metal, and provided with a sliding door, c, and a chimney, D, which projects up through a circular opening in the cover B. Fitting closely within chimney D is a tube, D', closed by a foraminated plate at its upper end or top, thus forming, with the pipe D, a telescopic chimney, which may be extended to increase the draft if occasion requires.

By the furnace C the lower part of the vessel A is divided into two compartments, E E, each semicircular in shape, into which may be inserted pans or vessels of a corresponding shape; or the compartments E E, which communicate with each other through the narrow space under the furnace, may be filled with soup or other fluid.

Upon the top of the furnace C is placed a spring or grate, F, overlapping the compartments E E, which forms a support for the upper pans or vessels, G G, one of which is placed on each side of the furnace, with an open space between them corresponding to the width of the furnace, into which is inserted the coffee-pot H, the bottom of which rests upon the top of the furnace.

The pans or vessels G G, as well as those, if any, inserted into the compartments E E, are provided with small loops or legs $g\ g$, which prevent them from touching the sides and bottom of the pail, so that the heat may pass freely all around said pans or vessels.

The drinking-cup I is placed in inverted position upon a tin cylinder, $i$, soldered upon the cover B, so as to be always handy and ready for use.

The furnace C contains a sliding drawer, C', within which may be placed a lamp, K. When this form of heater is used the drawer C', with the body of the lamp inserted into it, is left partially projecting outside of the furnace, as indicated in dotted lines in Fig. 4, which brings the burner and flame into the front part of the furnace, the door c of which is slid down upon the lamp, leaving only a narrow opening for the admission of the air required for perfect combustion. The side pieces of the drawer C' are made with raised and slanting ends $C^2$, so that by pushing down the sliding cover c the drawer, with the lamp, will of itself assume the proper position.

This apparatus, it will be observed, is exceedingly simple and compact, easily operated, and capable of being used for a variety of purposes.

Having thus described our invention, we claim and desire to secure by Letters Patent of the United States—

1. The pail or vessel A A' B, provided with the furnace C, having sliding drawer C' $C^2$, containing the lamp or heater K, telescopic chimney D D', and sliding door c, arranged and operating substantially as and for the purpose herein shown and described.

2. The combination, with the pail or vessel A A' B, divided by the furnace C into the semicircular compartments E E, of the grate F and vessels G H G, arranged upon both sides of and resting upon the top part of the furnace C, in the manner and for the purpose substantially as herein shown and set forth.

3. The combined cooking apparatus and dinner-pail herein shown and described, consisting of the vessel A A', provided with the perforated cover B and bail-handle $a$, furnace C, inserted transversely into the vessel A and provided with the telescopic chimney D D', sliding door $c$, and drawer C' C², adapted to receive a lamp, K, grate F, vessels G G, and coffee-pot H, placed upon the furnace between said vessels, substantially as and for the purpose herein shown and specified.

In testimony that we claim the foregoing as our own we have hereto affixed our signatures in presence of two witnesses.

JOHN HAPTONSTALL.
SAMUEL BANKS.

Witnesses:
F. M. ROUSH,
B. SUTTON.